G. L. SCHOFIELD.
CLAMP FOR SPOKE WHEELS.
APPLICATION FILED MAY 10, 1920.
1,378,563.
Patented May 17, 1921.
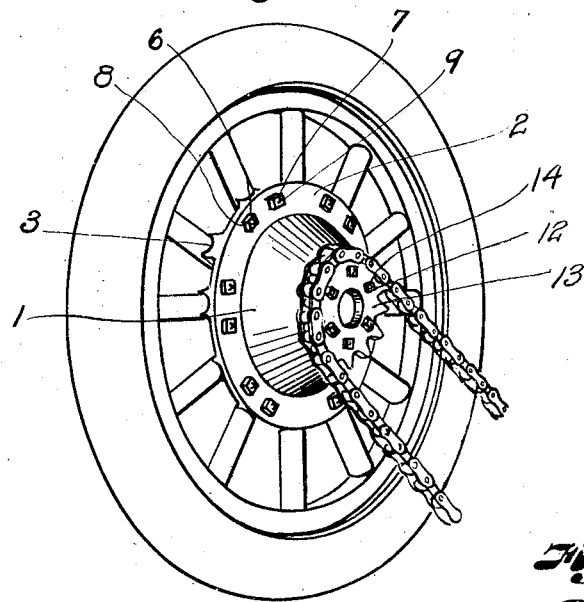
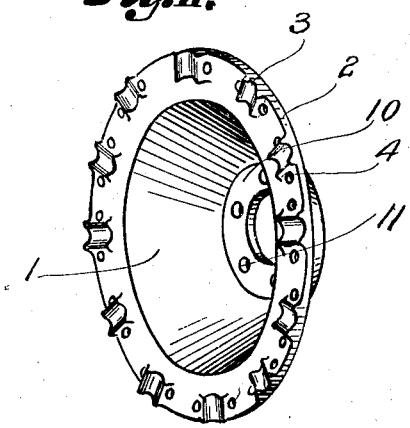
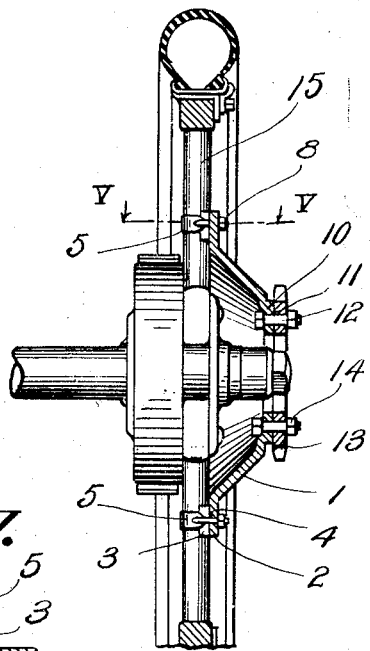
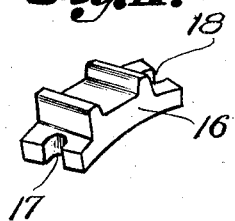
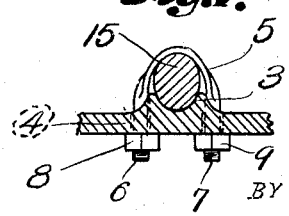
INVENTOR
George L. Schofield.
BY
ATTORNEY

UNITED STATES PATENT OFFICE.

GEORGE L. SCHOFIELD, OF KANSAS CITY, MISSOURI.

CLAMP FOR SPOKE-WHEELS.

1,378,563.  Specification of Letters Patent.  Patented May 17, 1921.

Original application filed July 1, 1918, Serial No. 242,911. Divided and this application filed May 10, 1920. Serial No. 380,169.

*To all whom it may concern:*

Be it known that I, GEORGE L. SCHOFIELD, a citizen of the United States, residing at Kansas City, in the county of Jackson and State of Missouri, have invented certain new and useful Improvements in Clamps for Spoke-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to clamps for spoke wheels and particularly to a clamp adapted to carry a sprocket, a gear or the like, from which power may be communicated to a driven element.

This application is a division of an application filed by me on or about July 1, 1918, Serial No. 242,911, which matured into Patent No. 1,356,475, October 19, 1920.

Motor vehicles are being employed in connection with work other than that for which they were originally intended, as for example, as the power medium of tractors, as power for driving saw mills and for other purposes, and I have provided means whereby a clamp may be applied to the rear wheel of a motor vehicle as an auxiliary element, so that the clamp may be useful in applying the power of the driving axle to some useful purpose other than propelling a motor vehicle.

Where the motor vehicle is used as the driving power for a tractor, means must be provided for transmitting the power from the motor vehicle to the driven part of the tractor; and a convenient means of doing this is through sprockets and chain.

I have provided a clamp to which a sprocket or gear may be secured, the clamp being readily adjusted to and easily removed from the spokes of a wheel. I have also provided means whereby the sprocket or gear may be placed in alinement with a driven element on the tractor irrespective of variations in the tread of the motor vehicle used as the driving power.

In the drawings:

Figure I is a perspective view of a clamp considered in accordance with my invention.

Fig. II is a detail perspective view of the clamp.

Fig. III is a transverse sectional view through a wheel to which my invention is applied.

Fig. IV is a detail view of a spoke engaging seat.

Fig. V is a sectional view on the line 5—5 of Fig. III.

The clamp is shown as consisting of a shell 1 of frusto conical form and provided at the base of the cone with an outwardly disposed circumferential flange 2, provided on its face with a plurality of spoke engaging seats 3 which may be formed integral with the flange 2. Between the seats 3 are openings 4 for the reception of fastening devices whereby the seats may be caused to bind against the spokes to secure the clamp in place.

The fastening devices are best shown in Fig. V as consisting of shackles 5 substantially U-shaped, the legs 6 and 7 being preferably threaded to receive the nuts 8 and 9, after the legs 6 and 7 have passed through the openings 4.

At the frustum of the cone is an inwardly extending flange 10 provided with a plurality of openings 11 to receive the fastening devices 12 which are shown as bolts whereby the sprockets 13 may be secured to the clamp, said sprockets being readily removable by loosening the nuts 14 so the different sprockets or gears may be readily adjusted to the clamp.

While I have shown a sprocket attached to the clamp, it is obvious that other devices might be applied, as for example a gear of proper construction.

When it is desired to apply the sprocket and clamp, it will only be necessary to center the clamp with respect to the wheel, causing the seats to rest against the spokes 15, whereupon the shackles 5 may be caused to engage the spokes with the legs 6 and 7 projecting through the openings 4, whereupon the securing nuts 8 and 9 may be applied in obvious manner.

Ordinarily the tread of motor vehicles is standardized at 56 inches, some motor vehicles however, have treads of 54 inches and most of the driven sprockets for tractors are arranged for 56 inch. If a motor vehicle with a lesser tread is employed, the sprocket 13 and the sprocket which it drives, would not be in alinement so in order to provide for the discrepancy, I have shown supplemental seats 16 in Fig. IV which may be placed against the flange 2 between the seats 3 and these seats 16 are provided at their ends with notches 17 and 18 adapted to be engaged by the legs 6 and 7 of the shackle which may be projected through the openings 4 and have the nuts 8 and 9 secured thereto, the thickness of the body portions of the seats 16 will be determined generally to be one inch thick, so that if the sprockets on the tractor are arranged for a 56 inch tread and the motor vehicle has a 54 inch tread, the introduction of the supplemental seats will compensate for the discrepancy and the sprockets on the clamp will come into alinement with those on the tractor.

When it is desired to use the motor vehicle as a pleasure car, the clamp may be readily removed by releasing the shackles 5.

Having thus described my invention what I claim as new therein, and desire to secure by Letters-Patent, is:

1. A sprocket supporting member comprising a shell having an inwardly projecting flange at one end, means for securing the sprocket to said flange and an outwardly projecting flange at the other end provided with spoke engaging seats and means for binding the seats and spokes together.

2. A sprocket supporting member, removable spoke engaging seats at one end of said member and fastening devices engaging the spokes of the wheel to which the device is attached, said fastening devices passing through the said member engaging the seats to hold them in place.

3. A device of the class described comprising a frusto conical shell, an inwardly approaching flange on the frustum of the shell, and an outwardly projecting flange on the base of the cone and spoke engaging seats on the last mentioned flange.

In testimony whereof I affix my signature.

GEORGE L. SCHOFIELD.